United States Patent [19]

Ando et al.

[11] Patent Number: 5,223,913
[45] Date of Patent: Jun. 29, 1993

[54] SPECTROPHOTOMETER

[75] Inventors: Osamu Ando; Toshiaki Fukuma, both of Kyoto, Japan

[73] Assignee: Shimadzu Corporation, Kyoto, Japan

[21] Appl. No.: 858,631

[22] Filed: Mar. 27, 1992

[30] Foreign Application Priority Data

Mar. 29, 1991 [JP] Japan .................................. 3-65143

[51] Int. Cl.[5] .............................................. G01J 3/02
[52] U.S. Cl. ................................................... 356/328
[58] Field of Search ............... 356/319, 323, 325, 326, 356/328, 332, 334

[56] References Cited

U.S. PATENT DOCUMENTS

| | | | |
|---|---|---|---|
| 4,323,309 | 4/1982 | Akitomo et al. | 356/319 |
| 4,971,439 | 11/1990 | Brown | 356/319 |

FOREIGN PATENT DOCUMENTS

277720 8/1988 European Pat. Off. .
381053 8/1990 European Pat. Off. .
3527083 4/1986 Fed. Rep. of Germany .

*Primary Examiner*—F. L. Evans
*Attorney, Agent, or Firm*—Oliff & Berridge

[57] ABSTRACT

A spectrophotometer including: a) a light source switching mechanism for switching a plurality of light sources by swinging a light source mirror; b) a filter selecting mechanism; c) a diffraction grating rotating mechanism; and d) a controller for determining the operation origins of the three driving mechanisms using a rough origin sensor provided for the diffraction grating rotating mechanism and a photometer. The operation of the controller is to: i) determine an origin of the movement of the filter by making an end of the filter frame to touch a stopper; ii) determine a rough origin of the diffraction grating using the rough origin sensor; and iii) determine an origin of the movement of the light source mirror and a precise origin of the movement of the diffraction grating by detecting the position at which the photometer detects the maximum intensity of light.

7 Claims, 9 Drawing Sheets

PRIOR ART

SPECTROPHOTOMETER

The present invention relates to a spectrophotometer for automatically setting a target wavelength or automatically scanning a preset wavelength range, and more specifically to a mechanism for determining the operation origins of several driving mechanisms of a spectrophotometer.

BACKGROUND OF THE INVENTION

In a typical spectrophotometer, the target wavelength or wavelength range is automatically set or a preset wavelength range is automatically scanned by a computer-controlled motor. This automatic setting and scanning requires not only a mechanism for rotating a spectral element (such as a diffraction grating or a prism) with high precision but some other mechanisms working in conjunction with the spectral element rotating mechanism.

A spectrophotometer for use in the range covering the ultraviolet light and visible light normally includes two light sources, one for visible light and the other for ultraviolet light. In such a spectrophotometer, a light source switching mechanism is used to select and place either of the two light sources on an optical path according to the target wavelength or wavelength scanning range. The light source switching mechanism is realized by rotating a converging mirror or by shifting the light sources.

When a diffraction grating is used as the spectral element, the optical system of a spectrophotometer is designed so that only (positive or negative) first order diffraction light having the greatest diffraction intensity is emitted through the exit slit. The principle of the diffraction grating, however, also allows the exit slit to emit second order or higher order diffraction light, as well as the first order light. Ordinary spectrophotometers thus use a filter for eliminating unnecessary second or higher order diffraction light. In many spectrophotometers, several high-pass (for eliminating light of shorter wavelength) or band-pass colored glass filters are provided, and one of them is selected and placed in the optical path by a filter selecting mechanism depending on the wavelength of the operated light. The filter selecting mechanism is disposed before or after the diffraction grating.

These three driving mechanisms, that is, a) one for rotating the diffraction grating, b) one for switching the two light sources, and c) one for selecting the filter, are essential for a spectrophotometer that covers visible and ultraviolet range and automatically sets and scans a target wavelength or wavelength range. These driving mechanisms usually use stepping motors as the driving source because stepping motors are relatively small, easily controlled by a microcomputer, and can rotate at low speed without reduction gears. In a spectrophotometer, stepping motors of the driving mechanisms cooperate interlockingly with one another according to the target wavelength or scanning wavelengths under the control of a microcomputer. The stepping motors are usually controlled in an open-loop system.

Figure 9:
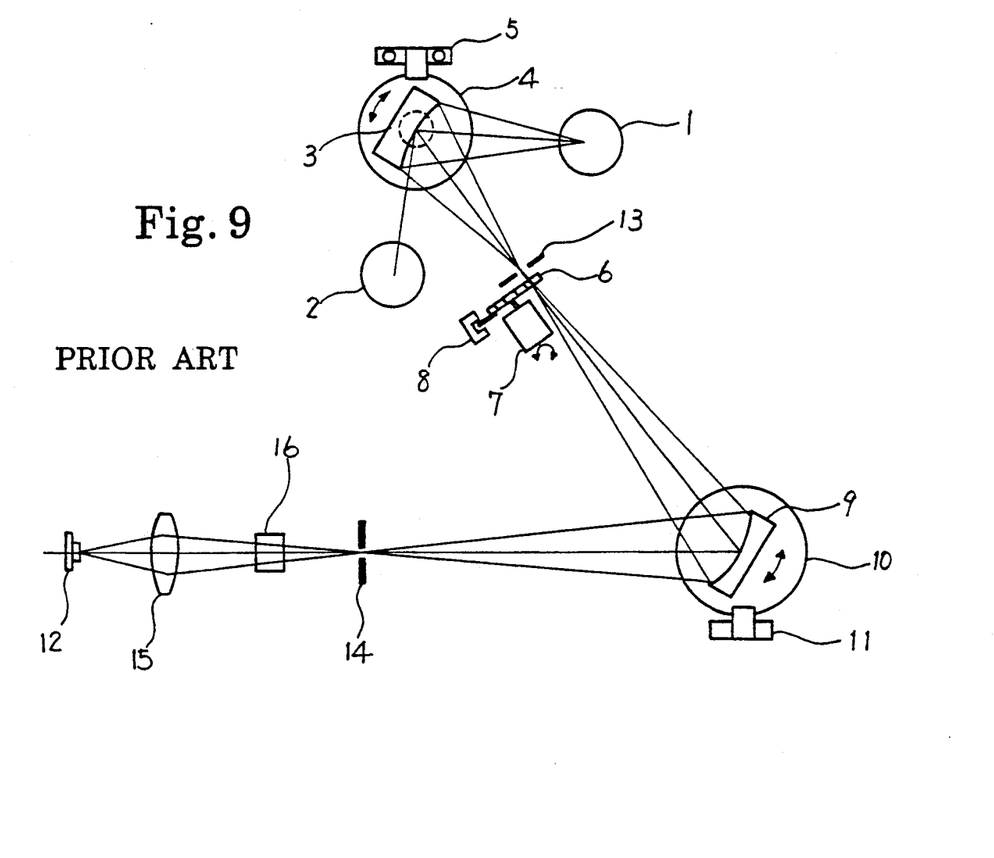
FIG. 9 is a schematic diagram of a typical structure of a prior art spectrophotometer.

FIG. 9 shows a typical prior art spectrophotometer that uses a swinging converging-mirror 3 for switching two light sources and a concave diffraction grating 9 as the spectral element. The converging mirror 3 is swung by a light source switching mechanism 4 to select either an ultraviolet light source 1 or a visible light source 2. A filter selecting mechanism 7 is provided for placing an appropriate filter 6 for cutting off higher order light in the optical path. The diffraction grating 9 is rotated by a diffraction grating rotating mechanism 10. White light coming through an entrance slit 13 is reflected, diffracted and converged by the concave diffraction grating 9, and a monochromatic image of the entrance slit 13 is focused on an exit slit 14, where the wavelength of the image on the exit slit 14 depends on the position of the diffraction grating 9. The monochromatic light emitted through the exit slit 14 passes through a sample 16, is focused on a photometer 12 by an optical system 15, and is measured by the photometer 12.

In normal operations, the stepping motors used as the driving sources of the mechanisms 4, 7, and 10 can be correctly controlled in an open-loop system without using a feed-back sensor. But, at the moment when the spectrophotometer is switched on and power supply to the motors are started, the rotational position of the stepping motors are indefinite: so are the position of the converging mirror 3, the position of the diffraction grating 9, and the kind of filter 6 placed in the optical path. Then it is impossible for the controller (microcomputer) of the spectrophotometer to control the stepping motors correctly according to a preset program unless the operation origins of the motors are determined.

Thus each driving mechanism using a stepping motor needs a mechanism for determining an operation origin. In the conventional spectrophotometer shown in FIG. 9, the operation origins of the driving mechanisms (light source switching mechanism 4, filter selecting mechanism 7, and diffraction grating rotating mechanism 10) are detected by respective origin detecting sensors 5, 8, and 11. The origin detecting sensor is a photoelectric sensor or a microswitch, which detects an opening or a pin formed on a moving (rotating or shifting) part of the driving mechanism and determines the then position of the moving part as the operation origin of the stepping motor (or the driving mechanism). Such structure requires a detector for each of the three driving mechanisms, which causes various problems. Increase in the number of parts complicates the mechanisms and the whole control system. The precision and reliability of the detector itself need to be at the same high level as those needed for the spectrophotometer. These and other problems raise the cost of the spectrophotometer and lower the production efficiency.

When a photoelectric sensor is used as the origin detecting sensor, for example, many other auxiliary parts are necessary, including: a cable for connecting the sensor to a controller; a member for holding the sensor; a pin to be detected by the sensor; and a control circuit for transmitting signals from the sensor to a microcomputer. A microswitch also requires many auxiliary parts, and has poor reliability if used over a long time-period because of the mechanical contacts.

The reproducibility or precision of the operation origin depends on the precision of each origin detector. The precision of such sensors are generally not sufficiently high for general spectrophotometers which require high accuracy of setting the wavelength. In order to attain reproducibility or accuracy required to general spectrophotometers, costly high-quality sensors, complicated mechanism, and skilled adjustment are essential.

SUMMARY OF THE INVENTION

The general objective of the invention is accordingly to provide an improved spectrophotometer, and a specific objective of the invention is to provide a spectrophotometer with a simple-structured detection mechanism for determining operation origins of three driving mechanisms.

The above and other related objectives are realized by a spectrophotometer of the invention which includes:

a) at least two light sources (for example, that for ultraviolet light and that for visible light);

b) a light source switching mechanism for swinging a light source mirror for reflecting light from one of the light sources to an entrance slit of the spectrophotometer;

c) a spectral element (such as a diffraction grating or a prism) for separating the light coming through the entrance slit into a series of monochromatic component lights;

d) a spectral element driving mechanism for rotating the spectral element to cast the separated light to an exit slit of the spectrophotometer, the spectral element driving mechanism including a rough origin detector for detecting a rough origin of the movement of the spectral element;

e) a filter frame including a plurality of filters (for example, short-wavelength-cutting filters or band-pass filters for cutting off high-order refraction light when a diffraction grating is used as the spectral element);

f) a filter selecting mechanism for placing one of the filters in an optical path of the spectrophotometer, the filter selecting mechanism including a stopper for restricting the movement of the filter frame, g) a photometer for measuring light coming out of the exit slit; and h) a controller for i) determining an origin of the movement of the filter by making an end of the filter frame to touch the stopper;

ii) determining a rough origin of the spectral element using the rough origin detector; and iii) determining an origin of the movement of the light source mirror and a precise origin of the movement of the spectral element mechanism by detecting the position at which the photometer detects the maximum intensity of light.

The origin of the movement of the light source mirror may be determined by:

i) turning on one of the light sources;

ii) swinging the light source mirror; and iii) determining the position of the light source mirror at which the photometer detects the maximum intensity of light.

The precise origin of the movement of the spectral element may be determined by:

i) bringing the light source mirror to the position where the strongest light from a light source is given to the spectral element based on the origin of the movement of the light source mirror;

ii) bringing the spectral element to the position where the zero-th order refraction light is directed to the photometer using the rough origin; and iii) determining the precise origin of the movement of the spectral element at which the photometer detects the maximum intensity of light.

The precise origin of the movement of the spectral element may be determined by detecting the position of the spectral element at which the line spectra pattern detected by the photometer matches a known line spectra pattern of the light source, instead of the position of the maximum intensity.

The above and further objectives and features of the invention will be apparent from the following detailed description of a preferred embodiment with the accompanying drawings.

DETAILED DESCRIPTION OF A PREFERRED EMBODIMENT

Figure 10:
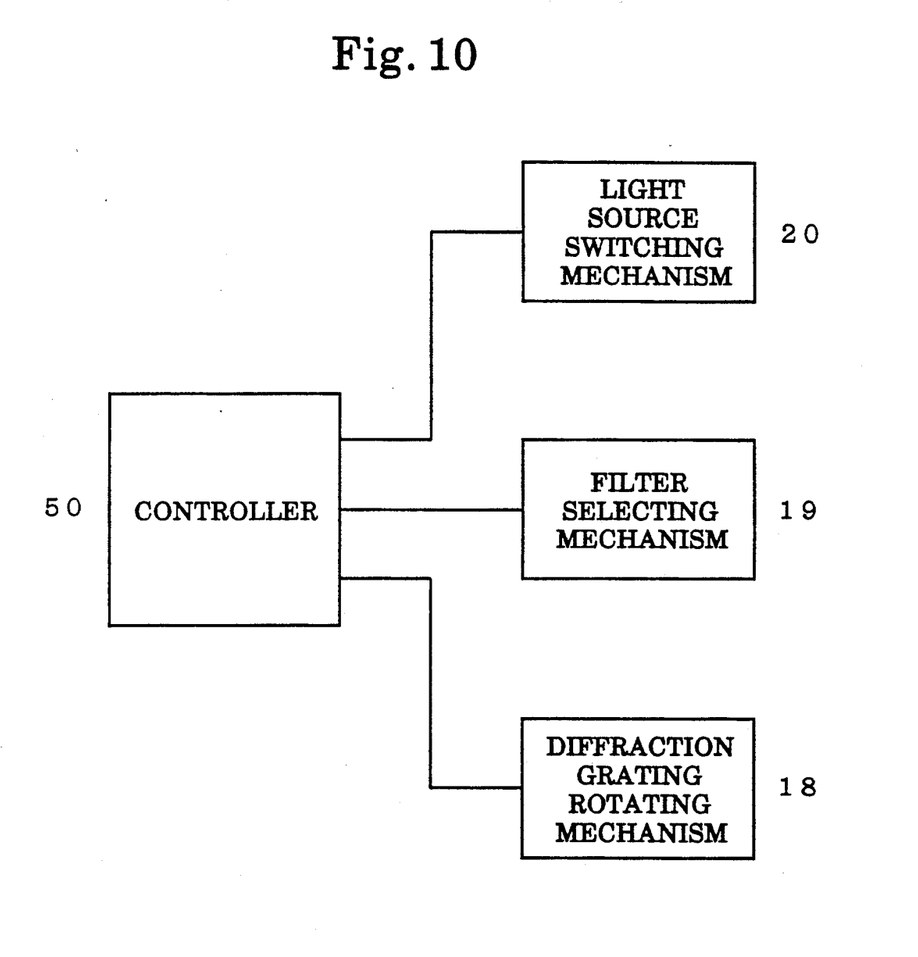
FIG. 10 is a block diagram of the control system of the spectrophotometer of the embodiment.

A preferred embodiment of the invention is now described referring to the accompanying drawings. The spectrophotometer of the present embodiment includes two light sources 1 and 2, an entrance slit 13, selectable filters 6, a diffraction grating 9 as the spectral element, an exit slit 14, a sample holder for holding a sample 16, and a photometer 12, which are arranged as shown in FIG. 9. The two light sources 1 and 2 are switched by a light source switching mechanism 20, a filter 6 is selected by a filter selecting mechanism 19, and the diffraction grating 9 is rotated by a diffraction grating rotating mechanism 18, all of which are systematically controlled by a controller 50 including a microcomputer as shown in FIG. 10. Each driving mechanism 18, 19, or 20 uses a stepping motor as its driving source, and the stepping motors of the driving mechanisms 18, 19, and 20 are connected to the controller 50, which controls the stepping motors (or the driving mechanisms 18, 19 and 20) according to a predetermined program stored in the controller 50.

Figure 1:
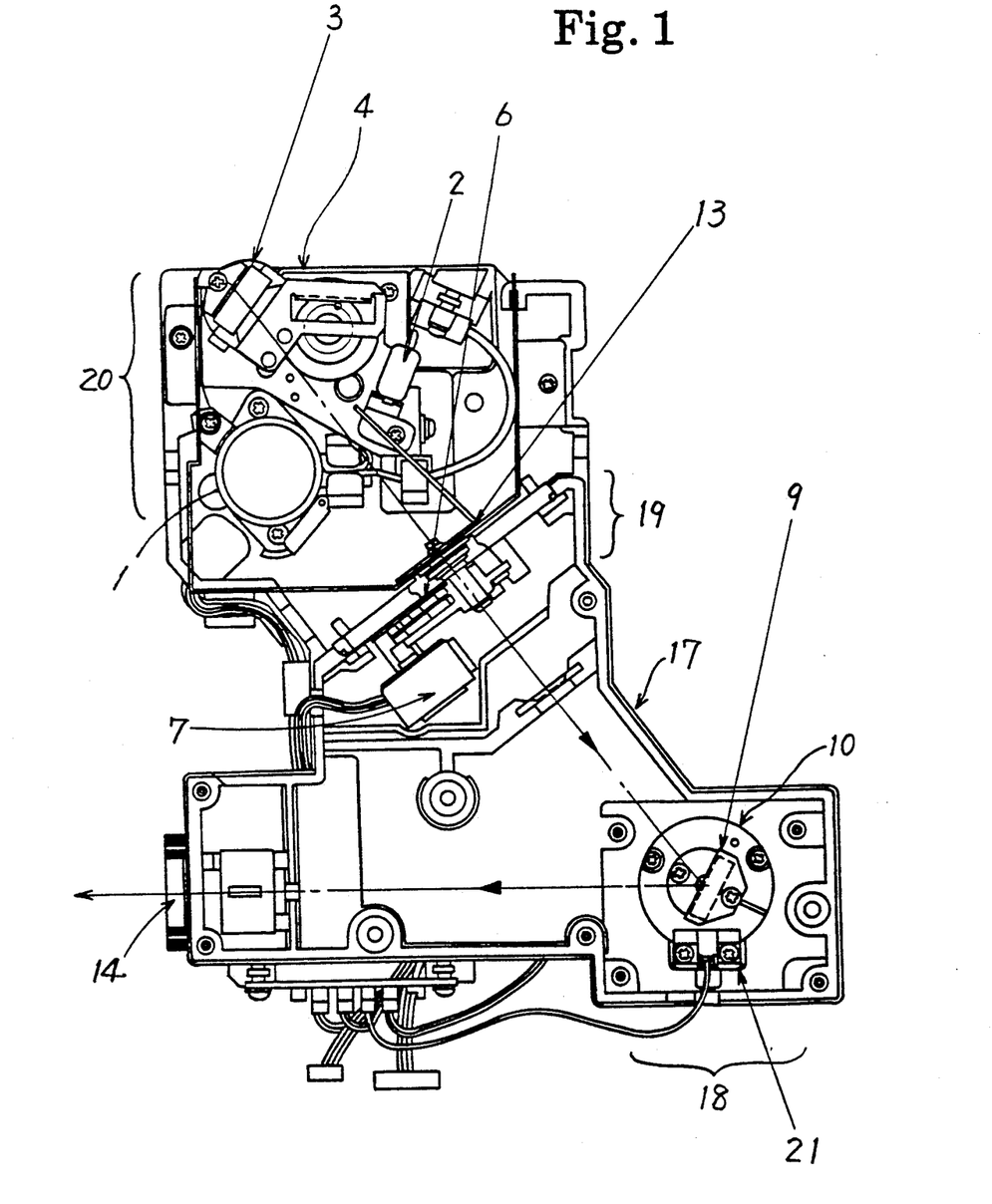
FIG. 1 is a plan view showing light sources and a diffraction grating of a spectrophotometer embodying the present invention.

FIG. 1 shows the part of the spectrophotometer of the present embodiment including the light sources and monochromator. Since the spectrophotometer of the present embodiment operates in the regions of both ultraviolet and visible lights, it has two lamps: one 1 for ultraviolet light and the other 2 for visible light. In the optical and mechanical system of FIG. 1, the light source switching mechanism 20, the filter selecting mechanism 19, the diffraction grating rotating mechanism 18, the entrance slit 13, and the exit slit 14 are mounted on a common base 17.

Distinct from the prior art spectrophotometer shown in FIG. 9, the spectrophotometer of the present embodiment does not have origin detecting sensors in all of the driving mechanisms 18, 19 and 20. Only the diffraction grating rotating mechanism 18 includes a rough origin sensor (a photoelectric sensor) 21 for detecting a rough origin of the movement (rotation) of the diffraction grating 9. The rough origin sensor 21 is also connected to the controller 50. The other two driving mechanisms 19 and 20 do not have any such position sensor or angle sensor.

Operations of each mechanism for determining origin of the movement of the mechanism are now described.

Figure 2:
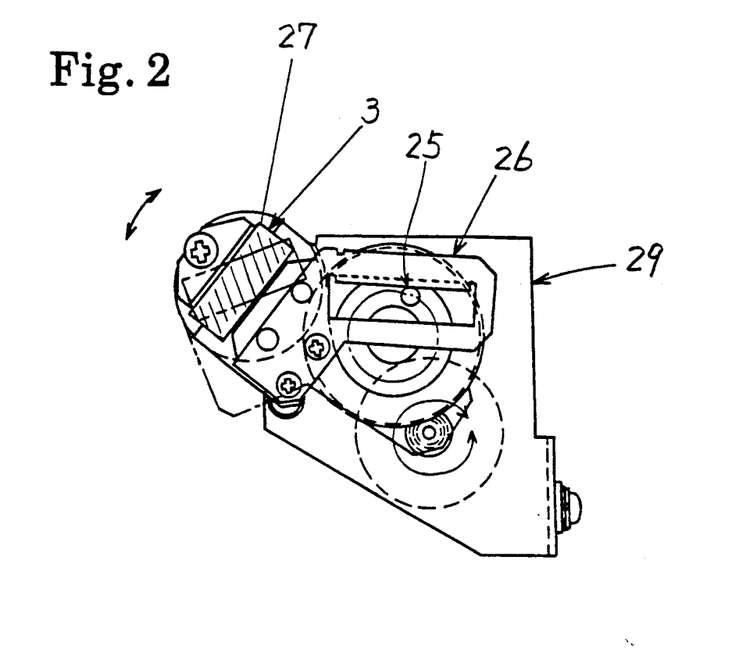
FIG. 2 is a plan view showing a light source switching mechanism and a converging mirror.
Figure 3:
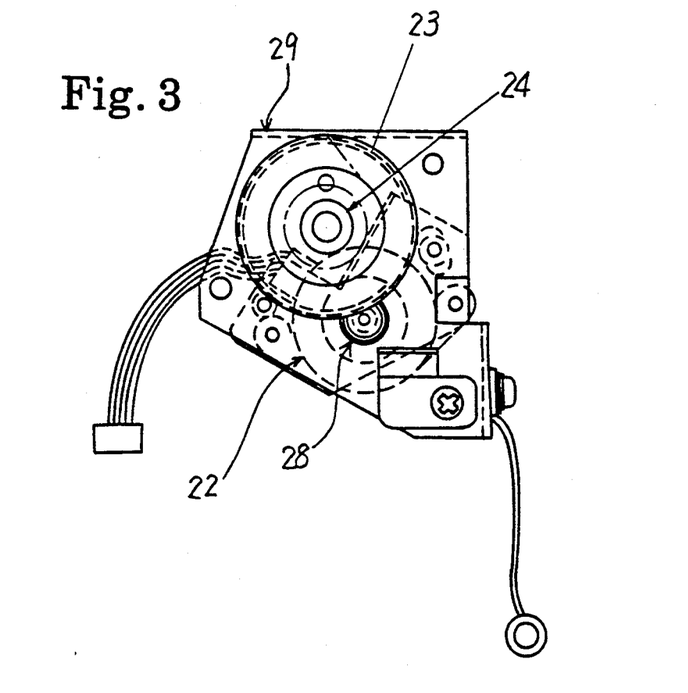
FIG. 3 is a plan view showing the light source switching mechanism of FIG. 2.
Figure 4:
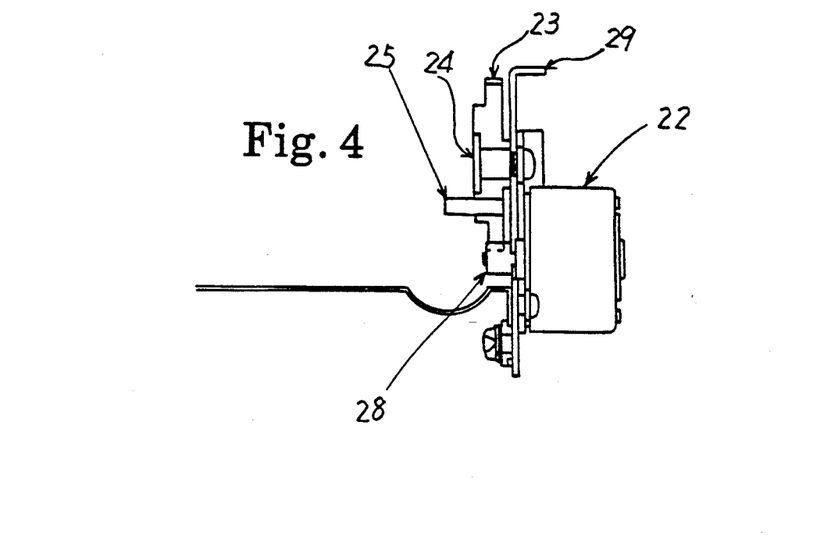
FIG. 4 is a side view showing the light source switching mechanism of FIG. 2.

The light source switching mechanism 20 swings the converging mirror 3 and converges the light flux from either the ultraviolet light source 1 or the visible light source 2 to the entrance slit 13 of the monochromator. An example of the light source switching mechanism 20 is shown in FIGS. 2 through 4. Rotation of a stepping motor 22 is reductively transmitted from a pinion gear 28 on the output shaft of the stepping motor 22 to a switching gear 23, which rotates about a pin 24 fixed on a base 29 of the light source switching mechanism 20. The converging mirror 3 is held by a mirror holder 27, which is rotatable about the vertical line passing through the apex of the concave converging mirror 3. The mirror holder 27 is supported by a bearing on the common base 17. A switch lever 26 is fixed to the mirror holder 27 and the switch lever 26 is urged by a spring (now shown) to a pin 25 planted on a circumference of the switching gear 23.

Rotation of the stepping motor 22 is reduced to one sixth by the pinion gear 28 and the switching gear 23, and the pin 25 on the switching gear 23 moves circularly at a speed one sixth of the rotating speed of the stepping motor 22. When the pin 25 rotates, the switch lever 26 urged to the pin 25 swings about the rotational center of the mirror holder 27, and so does the converging mirror 3. In the embodiment, the rotational center of the switching gear 23 and the mirror holder 27, and the length of the switch lever 26 are designed so that the swing angle of the switch lever 26 (that is, the swing angle of the converging mirror 3) is approximately thirty degrees when the pin 25 travels a circle. The two light sources 1 and 2 are placed within the angle of sixty degree or less with respect to the swinging center of the converging mirror 3. Thus light from any of the two light sources can be converged on the entrance slit 13 by the reflection of the converging mirror 3. In the embodiment, neither rotation of the gears 28 and 23 nor movement of the switch lever 26 is restricted, and the stepping motor 22 can rotate endlessly, so that the switch lever 26 and the converging mirror 3 can freely swing through the angle of approximately thirty degrees. The light source switching mechanism 20 does not include a sensor for detecting the origin of the swinging motion of the converging mirror 3.

Figure 5:
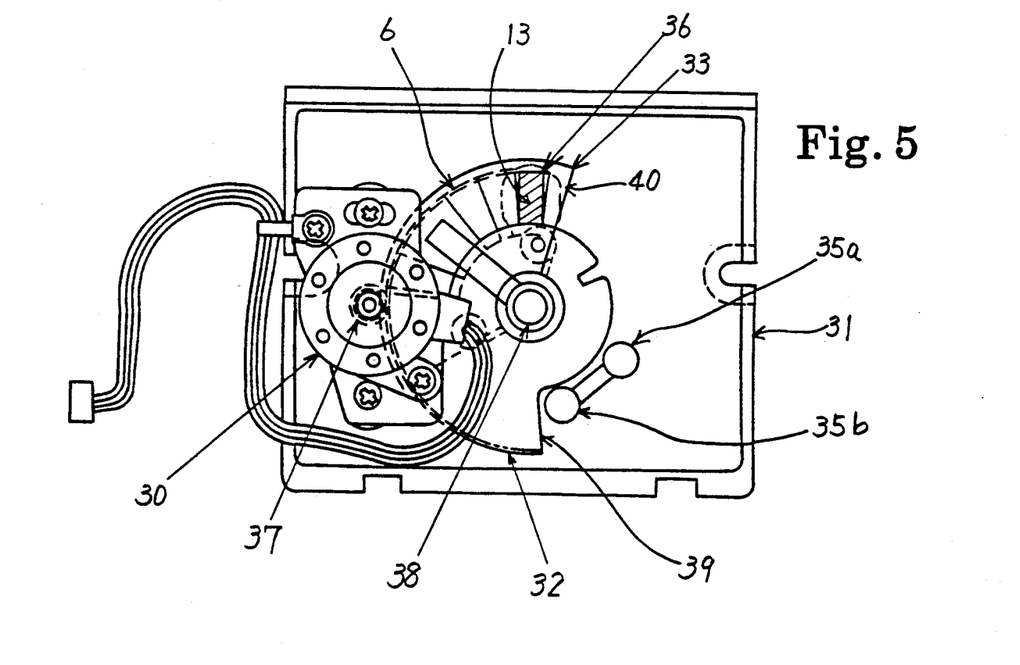
FIG. 5 is a front view of a filter selecting mechanism.
Figure 6:
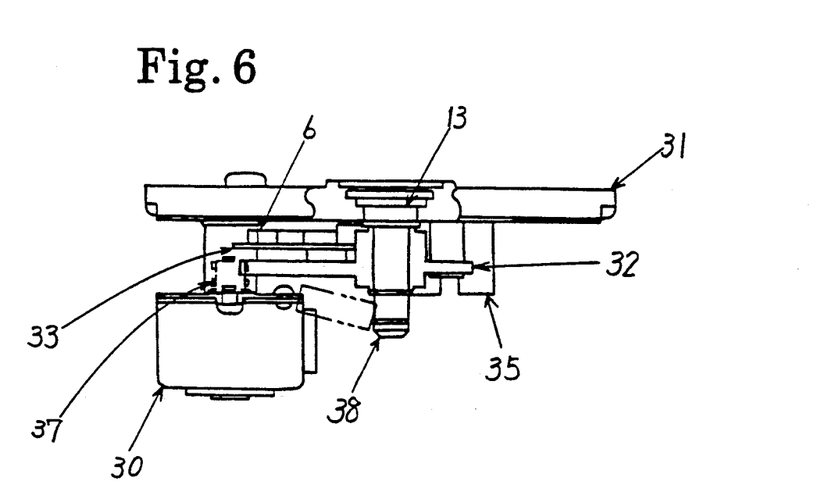
FIG. 6 is a plan view of the filter selecting mechanism of FIG. 5.

The filter selecting mechanism 19 is shown in FIG. 5 and FIG. 6. On a base 31 of the filter selecting mechanism 19, a thin slit plate having the entrance slit 13 and a stepping motor 30 are fixed. A plurality of high order light cut-off filters 6 prepared corresponding to the wavelength range of the spectrophotometer are held by a filter frame 33, which is rotatable about a pin 38 fixed on the base 31. An arc gear 32 is fixed to the filter frame 33 with a screw (not shown), which engages a pinion gear 37 fixed on an output shaft of the stepping motor 30. The gear ratio of the gears 37 and 32 are designed so that the rotation of the stepping motor 30 is reduced to one tenth. In a typical arrangement of the spectrophotometer for visible and ultraviolet spectra, the filters 6 consists of three high-pass filters for longer wavelengths and two band-pass filters for shorter wavelengths. Besides the five filters 6, the filter frame 33 has an open aperture 36. The five filters 6 and the open aperture 36 are arranged to form an arc around the rotating center of the arc gear 32, whereby one of the filters 6 or the open aperture 36 is placed to cover the entrance slit 13 while the filter frame 33 with the arc gear 32 is rotated by the stepping motor 30. In the embodiment, the filters 6 and the open aperture 36 are arranged regularly at intervals of fifteen degrees. Since the rotation of the stepping motor 30 is reduced to one tenth, 150-degree rotation of the output shaft of the stepping motor 30 is sufficient to change one filter to another (and the open aperture 36). Here the open aperture 36 is provided in order to give the strongest light through the entrance slit 13 directly to the spectral element and to use the maximum light energy in the measurement. The open aperture 36 can be used in a very short wavelength range where an appropriate band-pass glass filter does not exist and high order light does not enter the optical path.

Two bosses are formed on the base 31 to work as stoppers 35a and 35b for restricting rotation of the filter frame 33 with the arc gear 32 (the combined unit is hereinafter referred to as a arc-gear/filter-frame unit). When, in FIG. 5, the arc gear 32 is driven clockwise out of a predetermined range, an end 40 of the arc-gear/filter-frame unit (actually an end of the filter frame 33) touches the stopper 35a. When the arc gear 32 is driven counterclockwise out of a predetermined range, on the other hand, the other end 39 of the arc-gear/filter-frame unit (actually an end of the arc gear 32) touches the other stopper 35b. The position of the stoppers 35a and 35b and the ends 40 and 39 of the arc-gear/filter-frame unit are designed to ensure sufficient rotating angle of the filter frame 33 to place the five filters 6 and the open aperture 36 at the optical path passing through the entrance slit 13. Since the five filters 6 and the open aperture 36 are arranged at fifteen degree intervals, the necessary rotating angle of the arc gear 32 is $15 \times (6-1) = 75$ degrees. The actual rotating angle of the arc gear 32 is set at seventy eight (78) degrees, three degrees wider than the necessary minimum.

When the power to the spectrophotometer is turned on, the position of the arc gear 32 and the filter frame 33 is indefinite. In the mechanism of the embodiment thus constructed, the stepping motor 30 is driven until either end of the arc-gear/filter-frame unit touches the stopper 35b or 35a, where the operation origin of the filter selecting mechanism 19 (or the origin of the movement of the filter frame 33) is determined without using a specific sensor. When the arc gear 32 is rotated either clockwise or counter-clockwise through the predetermined angle (that is, the 78 degree angle), either end 39 and 40 of the arc-gear/filter-frame unit touches the stopper 35b or 35a. The rotational angle of the stepping motor 30 necessary to rotate the filter frame seventy eight (78) degrees is thus 780 degrees (two rotations and sixty degrees), regarding the reduction ratio 1/10 of the gears 37 and 32. If the stepping motor 30 is driven full 780 degrees, the stepping motor 30 is disordered after either end 39 or 40 touches a stopper 35a or 35b. This does not cause real problem if the torque and the speed of the stepping motor 30 are selected properly so that the load to the stepping motor 30 and the pressure to the teeth of the gears 37 and 32 is small. Further, the origin-determining procedure is executed only once at the starting time of the spectrophotometer, and in the subsequent normal operation the stepping motor 30 does not undergo such a disorder because the normal operation is based on the origin such determined. It is preferable to make the dimensions of the filters 6 and the open aperture 36 sufficiently larger than the light flux. In this case, the requirement for the precision of the operation origin of the filter selecting mechanism 19 can be lower than that of the diffraction grating rotating mechanism 18 or the light source switching mechanism 20.

Figure 7:
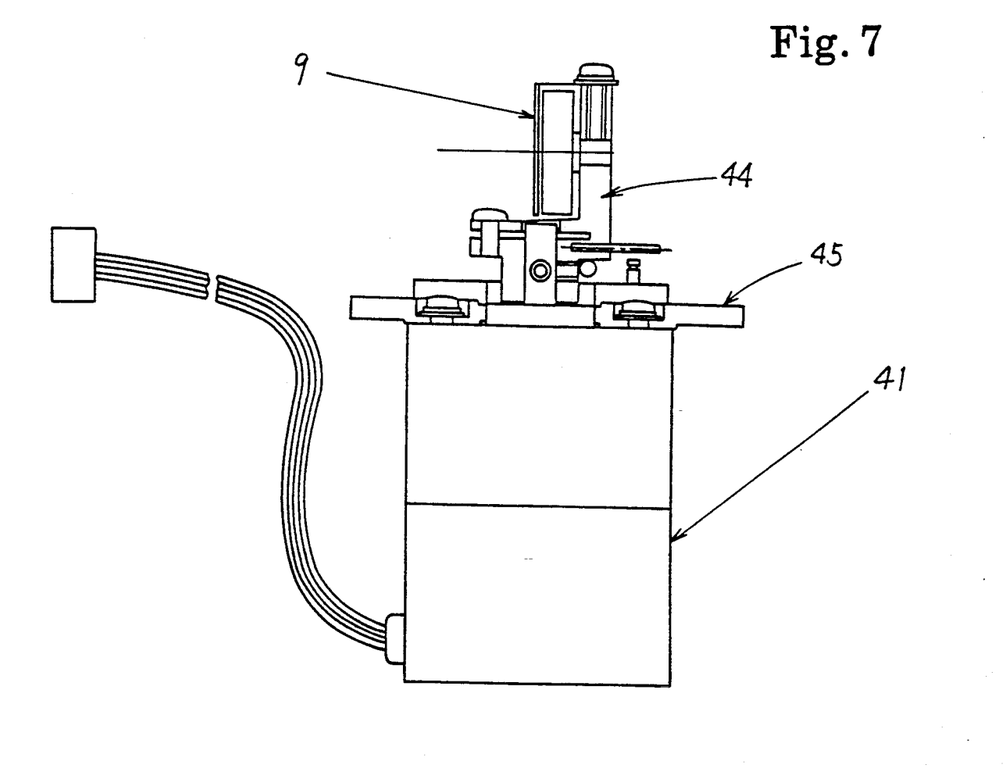
FIG. 7 is a front view of a diffraction grating rotating mechanism.
Figure 8:
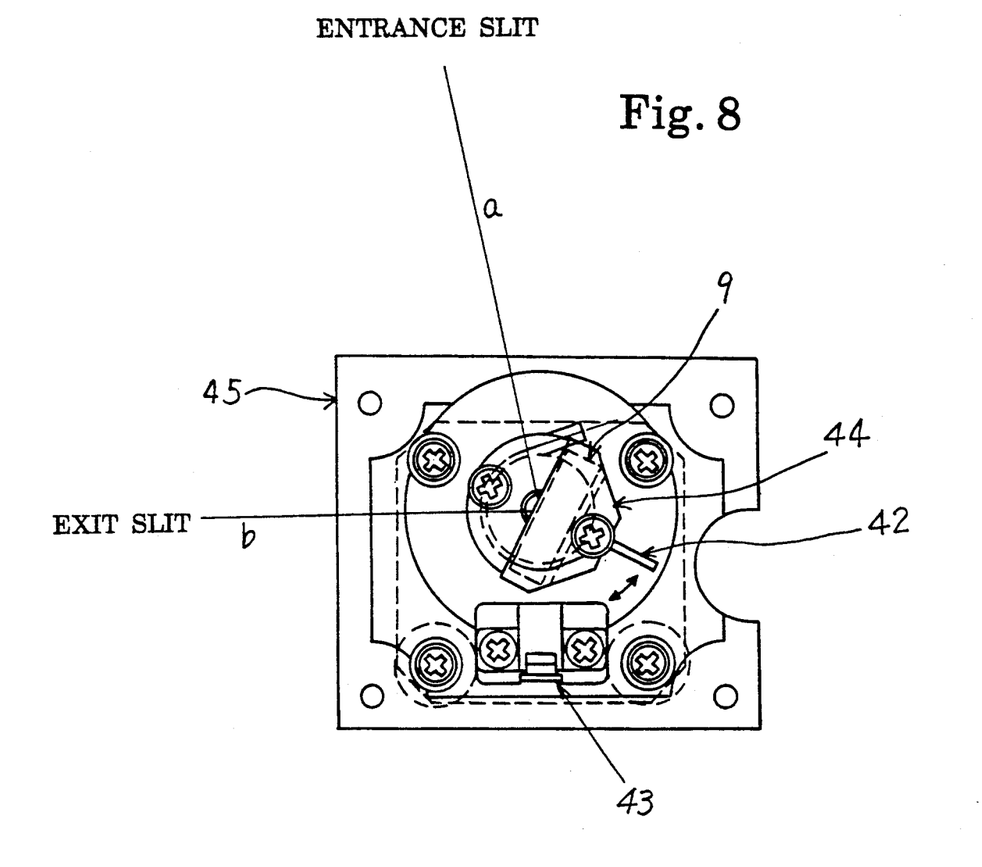
FIG. 8 is a plan view of the diffraction grating rotating mechanism of FIG. 7.

The diffraction grating rotating mechanism 18 is shown in FIG. 7 and FIG. 8. White light coming through the entrance slit 13 along the line a is reflected, diffracted and converged by the concave diffraction grating 9 and an image of the entrance slit 13 of a monochromatic light is focused on the exit slit 14. A motor unit 41 for rotating the diffraction grating 9, including a stepping motor and reduction gears, is fixed to a base 45. A diffraction grating holder 44 holding the diffraction grating 9 is fixed to an output shaft of the motor unit 41 and rotates about the vertical line passing through the apex of the diffraction grating 9. As the diffraction grating 9 rotates about the vertical line driven by the motor unit 41, wavelength of the monochromatic light focused on the exit slit 14 is scanned. It is provided in FIG. 8 that the angle between the normal line at the apex of the concave diffraction grating 9 and the line b connecting the apex and the exit slit 14 when emitting zero-th order light is twenty six degrees, and the lattice constant of the diffraction grating 9 is 1/900 mm. When the maximum wavelength of the spectrophotometer is 900 nm, the rotational angle of the diffraction grating 9 is then approximately thirty degrees for scanning the monochromatic light focused on the exit slit 14 from the zero-th order light (direct reflection) to the maximum wavelength light.

A pin 42 protruding from the diffraction grating holder 44 is detected by a photoelectric sensor 43, so that a rough origin of the rotation of the diffraction grating 9 is determined. The precision of the detection of the sensor 43 need not be so high because the sensor 43 is not intended to determine a precise origin of the wavelength scanning.

The diffraction grating rotating mechanism 18 is an essential element for the high accuracy of the wavelength determination of a spectrophotometer, and thus is required a high precision and reproducibility. In the embodiment, for example, the wavelength range of the spectrophotometer is 0 to 900 nm, and the rotational angle of the diffraction grating 9 is thirty degrees. Linear relationship between the rotational angle of the diffraction grating 9 and the wavelength of monochromatic light focused on the exit slit 14 is assumed for simplicity. When the wavelength accuracy of the spectrophotometer is in the range of ±1 nm, the precision and reproducibility required for the rotational angle of the diffraction grating is ±30/900=±0.033 degrees or smaller. When the rotating radius of the pin 42 is provided to be 15 mm, the precision and the reproducibility of the position of the pin 42 detected by the sensor 43 should be:

$$15 \times 2\pi \times 0.033/360 = \pm 0.0086 \text{ mm} = 8.6 \text{ μm}.$$

Such a high precision cannot be realized by using commercially available low-cost sensors.

The sensor 43 of the present embodiment, on the other hand, can have a lower precision of detection to such an extent that the diffraction grating 9 focuses some monochromatic light on the exit slit 14. In other words, the precision of the sensor 43 is sufficient if any monochromatic light can be emitted through the exit slit 14 when light from either the ultraviolet light source 1 or the visible light source 2 is given through the entrance slit 13 to the diffraction grating 9. Specifically saying, the required precision is about 200 nm in terms of the wavelength when using the visible light source, and thus the precision required to the sensor 43 is about ±0.8 mm, which is a hundred times larger (looser) than as calculated before (±8.6 pm). This precision can be realized even by a commercially available low-cost photoelectric sensor.

The precise origin of the diffraction grating rotating mechanism 18 is then determined using the rough origin thus determined. First the diffraction grating 9 is rotated promptly through a preset angle to a preset search starting position which is predetermined at proximity of the position where the zero-th order light is focused on the exit slit 14. Then, starting from the search starting position, the diffraction grating 9 is rotated slowly through a small angle, while the intensity of light coming out of the exit slit 14 is measured. The precise origin can be determined from the position of the diffraction grating 9 at which the light (zero-th order light or any monochromatic light) coming out of the exit slit 14 is locally maximum. Instead of detecting the local maximum of the intensity of light, the line spectra pattern detected by the photometer may be compared to a known line spectra pattern of the light source: the origin can be determined when the detected line spectra pattern matches the known pattern. When a deuterium lamp is used for the ultraviolet light source, either maximum intensity detection or the line spectra pattern matching can be used, while only maximum intensity detection is practical in case of a tungsten-iodine visible light source.

If no rough origin is available beforehand, the diffraction grating rotating mechanism 18 may have to rotate the diffraction grating 360 degrees to look for the maximum position. In the system of the embodiment, however, the search time is minimized since the rough origin can be used to calculate the starting point of the search for the maximum intensity. Thus the time for determining the precise origin is minimized and the diffraction grating rotating mechanism 18 is simplified.

Figure 11:
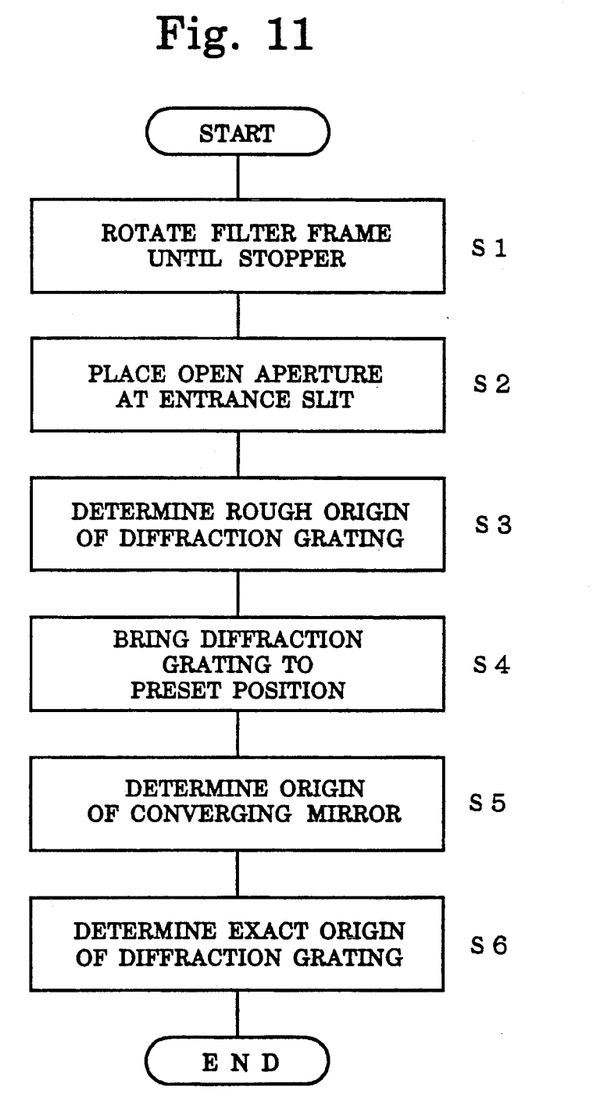
FIG. 11 is a flowchart of the control by the controller for determining the operation origin of the three driving mechanisms of the spectrophotometer.

In summary, the controller 50 of the spectrophotometer of the present invention controls the three mechanisms 18, 19 and 20 as shown in FIG. 11 for the initialization of the spectrophotometer (that is, for determining the respective origins of the driving mechanisms 18, 19 and 20). When the spectrophotometer is turned on, the rotational position of the stepping motors of the driving mechanisms 18, 19 and 20 are indefinite. The controller 50 first rotates the filter frame 33 of the filter selecting mechanism 19 until it touches a stopper (step Sl). This determines an origin of the filter selecting mechanism 19. Then the filter frame 33 is rotated a preset angle with respect to the origin to bring the open aperture to the entrance slit 13 (step S2). Next, in the diffraction grating rotating mechanism 18, a rough origin is determined using the rough origin sensor 21 (step S3). Based on the rough origin, the diffraction grating 9 is brought to a predetermined position at which the zero-th order light (that is, the direct reflection of the light from the entrance slit 13) is focused on the exit slit 14 (step S4). This position of the diffraction grating 9 can be predetermined according to the geometry of the spectrophotometer.

Then the converging mirror 3 of the light source switching mechanism 20 is swung through a preset angle, and an origin of the light source switching mechanism 20 corresponding to one of the light sources is determined at which the photometer 12 detects the maximum intensity (step S5). Another origin of the light source switching mechanism 20 corresponding to the other light source is determined similarly. It is possible here to determine a single common origin of the movement of the light source mirror 3 for the two light sources 1 and 2. Finally, the precise origin of the diffraction grating rotating mechanism 18 is determined similarly using the photometer 12 (step S6).

In the system of the invention, a single, low-precision angular position sensor can detect the operation origins of the three driving mechanisms of the spectrophotometer, that is, the light source switching mechanism, the filter selecting mechanism, and the diffraction grating rotating mechanism with sufficient precision. Thus the system according to the invention simplifies the driving mechanisms and the control circuit, which reduces the cost and increases the productivity, and the reliability of the system is enhanced. The present invention is preferably applied to spectrophotometers with concave diffraction gratings.

What is claimed is:

1. A spectrophotometer comprising:
   a) at least two light sources;
   b) a light source switching mechanism for swinging a light source mirror for reflecting light from one of the light sources to an entrance slit of the spectrophotometer;
   c) a spectral element for separating the light coming through the entrance slit into a series of monochromatic component lights;
   d) a spectral element driving mechanism for rotating the spectral element to cast the separated light to an exit slit of the spectrophotometer, the spectral element driving mechanism including a rough origin detector for detecting a rough origin of the movement of the spectral element;
   e) a filter frame including a plurality of filters;
   f) a filter selecting mechanism for placing one of the filters in an optical path of the spectrophotometer, the filter selecting mechanism including a stopper for restricting the movement of the filter frame;
   g) a photometer for measuring light coming out of the exit slit; and
   h) a controller for
      i) determining an origin of the movement of the filter by making an end of the filter frame to touch the stopper,
      ii) determining a rough origin of the spectral element using the rough origin detector, and
      iii) determining an origin of the movement of the light source mirror and a precise origin of the movement of the spectral element mechanism by detecting the position at which the photometer detects the maximum intensity of light.

2. The spectrophotometer according to claim 1, where the spectral element is a diffraction grating.

3. The spectrophotometer according to claim 2, where the controller determines the origin of the movement of the light source mirror by:
   i) turning on one of the light source;
   ii) swinging the light source mirror; and
   iii) determining the position of the light source mirror at which the photometer detects the maximum intensity of light.

4. The spectrophotometer according to claim 3, where the controller determines the precise origin of the movement of the spectral element by:
   i) bringing the light source mirror to the position where the strongest light from a light source is given to the spectral element based on the origin of the movement of the light source mirror;
   ii) bringing the spectral element to the position where the zero-th order refraction light is directed to the photometer using the rough origin; and
   iii) determining the precise origin of the movement of the spectral element at which the photometer detects the maximum intensity of light.

5. The spectrophotometer according to claim 3, where the controller determines the origin of the movement of the light source mirror by detecting the position of the light source mirror at which the line spectra pattern detected by the photometer matches a known line spectra pattern of the light source.

6. The spectrophotometer according to claim 4, where the controller determines the precise origin of the movement of the spectral element by detecting the position of the spectral element at which the line spectra pattern detected by the photometer matches a known line spectra pattern of the light source.

7. The spectrophotometer according to claim 6, where the filter frame includes an open aperture without a filter, and the controller makes the filter selecting mechanism to place the open aperture in the optical path of the spectrophotometer before the origin of the movement of the light source mirror and the precise origin of the movement of the spectral element are determined.

* * * * *